(12) United States Patent
Masiero et al.

(10) Patent No.: US 11,310,224 B2
(45) Date of Patent: Apr. 19, 2022

(54) ENHANCED SECURITY AUTHENTICATION SYSTEM

(71) Applicant: ADP, Inc., Roseland, NJ (US)

(72) Inventors: Roberto A. Masiero, Basking Ridge, NJ (US); Justo D. Pastor, Fairfield, NJ (US); Vincent Civetta, Randolph, NJ (US); Deepak Kaushal, Mendham, NJ (US); Francisco Villavicencio, Tenafly, NJ (US); Sanjoli Ahuja, Bridgewater, NJ (US); Madusudhanan Ragothaman, Woodbridge, NJ (US); Michael Nepomnyashy, Woodbridge, NJ (US); Krishna Chaitanya Pinnamaneni, Parsippany, NJ (US); Nishant Kaushik, Jersey City, NJ (US); Zhitao Steve Xu, Guttenberg, NJ (US); Philip M. O'Neill, Maplewood, NJ (US); Neha Pahwa, White Plains, NY (US)

(73) Assignee: ADP, Inc., Roseland, NJ (US)

( * ) Notice: Subject to any disclaimer, the term of this patent is extended or adjusted under 35 U.S.C. 154(b) by 921 days.

(21) Appl. No.: 15/433,921

(22) Filed: Feb. 15, 2017

(65) Prior Publication Data

US 2018/0234411 A1 Aug. 16, 2018

(51) Int. Cl.
*H04L 29/06* (2006.01)
*G06F 21/36* (2013.01)
(Continued)

(52) U.S. Cl.
CPC .......... *H04L 63/0853* (2013.01); *G06F 21/36* (2013.01); *G06F 21/43* (2013.01);
(Continued)

(58) Field of Classification Search
CPC . G06F 21/36; H04L 63/0853; H04L 63/0838; H04L 63/0876; H04L 63/107
See application file for complete search history.

(56) References Cited

U.S. PATENT DOCUMENTS

| | | | | |
|---|---|---|---|---|
| 7,233,786 B1* | 6/2007 | Harris | ............... | H04L 29/06027 455/412.1 |
| 8,892,446 B2* | 11/2014 | Cheyer | ................... | G10L 15/22 704/275 |

(Continued)

OTHER PUBLICATIONS

Gibson, "Secure Quick Reliable Login," Gibson Research Corporation, dated Aug. 2, 2015, 9 pages. https://www.grc.com/sqrl/sqrl.htm.

(Continued)

*Primary Examiner* — Tongoc Tran
(74) *Attorney, Agent, or Firm* — Yee & Associates, P.C.

(57) ABSTRACT

A method, computer system and computer program product for authenticating a transaction is provided. A service provider receives a transaction between a user and a website displayed on a first device. The service provider identifies a first geolocation of the first device. The service provider generates a code for display on the first device. The service provider receives credential information to identify the user and the code from a second device. The service provider identifies a second geolocation of the second device, and determines a level of risk for the transaction based at in part on the first geolocation and the second geolocation. In response to the level of risk being an acceptable level of risk, the service provider authenticates the user. The service provider generates information to enable the user on the first device to perform the transaction with the website, and sends the information to the website.

24 Claims, 6 Drawing Sheets

(51) Int. Cl.
  *G06F 21/43* (2013.01)
  *H04W 12/63* (2021.01)
  *H04W 12/77* (2021.01)

(52) U.S. Cl.
  CPC .......... H04L 63/105 (2013.01); H04L 63/107 (2013.01); *G06F 2221/2111* (2013.01); *H04L 2463/082* (2013.01); *H04W 12/63* (2021.01); *H04W 12/77* (2021.01)

(56) References Cited

U.S. PATENT DOCUMENTS

| | | | |
|---|---|---|---|
| 9,160,855 B2* | 10/2015 | Baranovsky | H04M 3/51 |
| 9,185,101 B2 | 11/2015 | Grigg et al. | |
| 9,213,825 B1 | 12/2015 | Gysin et al. | |
| 9,258,376 B2* | 2/2016 | Jensen | H04W 4/20 |
| 9,305,298 B2 | 4/2016 | Wilson | |
| 9,350,717 B1* | 5/2016 | Siddiqui | H04L 63/08 |
| 9,419,957 B1 | 8/2016 | Rouse et al. | |
| 10,200,481 B2* | 2/2019 | D'Agostino | G06Q 20/1085 |
| 2005/0187901 A1* | 8/2005 | Maritzen | H04L 63/08 |
| 2008/0152121 A1* | 6/2008 | Mandalia | H04M 3/51 |
| | | | 379/265.01 |
| 2009/0083768 A1* | 3/2009 | Hatalkar | G05B 15/02 |
| | | | 719/328 |
| 2010/0057688 A1* | 3/2010 | Anovick | G06Q 10/10 |
| | | | 707/E17.001 |
| 2010/0312764 A1* | 12/2010 | Liao | G06Q 10/10 |
| | | | 707/723 |
| 2012/0198570 A1 | 8/2012 | Joa et al. | |
| 2013/0054271 A1 | 2/2013 | Langford et al. | |
| 2013/0167208 A1 | 6/2013 | Shi | |
| 2013/0219479 A1 | 8/2013 | DeSoto et al. | |
| 2014/0130127 A1 | 5/2014 | Toole et al. | |
| 2014/0181911 A1* | 6/2014 | Kula | H04L 63/0853 |
| | | | 726/4 |
| 2014/0189784 A1 | 7/2014 | Marino et al. | |
| 2015/0229650 A1* | 8/2015 | Grigg | H04L 63/105 |
| | | | 726/7 |
| 2016/0226893 A1* | 8/2016 | Warikoo | H04L 63/1416 |
| 2016/0337353 A1 | 11/2016 | Coats | |
| 2017/0083898 A1* | 3/2017 | Sidhu | H04W 4/029 |
| 2017/0104740 A1* | 4/2017 | Hoy | G06F 3/017 |
| 2017/0118025 A1* | 4/2017 | Shastri | G06F 21/32 |
| 2017/0126649 A1* | 5/2017 | Votaw | G06F 16/24578 |
| 2017/0237554 A1* | 8/2017 | Jacobs | H04L 9/0819 |
| | | | 713/171 |
| 2017/0337240 A1* | 11/2017 | Chen | G06F 16/337 |
| 2018/0097910 A1* | 4/2018 | D'Agostino | H04L 67/32 |
| 2018/0143958 A1* | 5/2018 | Kakkad | G06F 17/243 |
| 2018/0144139 A1* | 5/2018 | Cheng | G06F 21/577 |
| 2018/0183737 A1* | 6/2018 | Subbarayan | H04L 51/02 |
| 2018/0227128 A1* | 8/2018 | Church | H04L 9/3247 |

OTHER PUBLICATIONS

"Qrljacking," Open Web Application Security Project (OSWASP), dated Feb. 11, 2017, 8 pages. https://www.owasp.org/index.php/Qrljacking.

"SQRL," Wikipedia, Wikimedia Foundation, Inc., dated Sep. 6, 2016, 4 pages. https://en.wikipedia.org/wiki/SQRL.

* cited by examiner

ENHANCED SECURITY AUTHENTICATION SYSTEM

BACKGROUND INFORMATION

1. Field

The present disclosure relates generally to an improved authentication system for a device and, in particular, to a method and system for authenticating a transaction from a user at a first device using credentials from a second device.

2. Background

Mobile devices, such as tablet PCs and smartphones, are increasing in popularity and are quickly replacing desktop Personal Computers (PC) in both consumer and business sectors. Mobile devices connected to the Internet allow users to access even the most sensitive information, such as payroll or other financial information, from anywhere a connection to the Internet is available.

Additionally, based on their close association with a particular user, mobile devices often provide additional security measures that are not widely available on desktop personal computers.

For example, the user often has an account with different service providers, such as employers, financial institutions, or other entities, each with a unique username and password associated with the account. Local security features of mobile devices, such as unlock screens and fingerprint scanners, allow the user to more securely manage access to the different accounts without becoming overwhelmed by the volume of passwords and credentials prior to accessing all of the accounts.

However, some users may still prefer the convenience of a desktop personal computer. A larger display and a more familiar interface often provide easier access to information. Additionally, certain applications or functionality may only be available via a web browser. Legacy applications as well as more data-centric applications, such as spreadsheet analysis and administrative functions, may not be available through a mobile location. In these cases, a web browser interface may be more suitable.

It would be desirable to have a method and apparatus that take into account at least some of the issues discussed above, as well as other possible issues. For example, it would be desirable to have a method and apparatus that overcome a technical problem with authenticating a transaction from the user at a first device, such as a desktop personal computer, using credentials from a second device, such as a mobile device.

SUMMARY

An embodiment of the present disclosure provides a method for authenticating a transaction of a user. A service provider receives a transaction between a user and a website displayed on a first device. The service provider identifies a first geolocation of the first device. The service provider generates a code for display on the first device. The service provider receives credential information to identify the user and the code from a second device. The service provider identifies a second geolocation of the second device, and determines a level of risk for the transaction based, in part, on the first geolocation and the second geolocation. In response to determining that the level of risk is an acceptable level of risk, the service provider authenticates the user. The service provider generates information to enable the user on the first device to perform the transaction with the website, and sends the information to the website.

Another embodiment of the present disclosure provides a computer system comprising a hardware processor and an authentication system in communication with the processor. The authentication system is configured to receive a transaction between a user and a website displayed on a first device. The authentication system is further configured to identify a first geolocation of the first device. The authentication system is configured to generate a code for display on the first device. The authentication system is further configured to receive the code and credential information to identify the user from a second device. The authentication system is further configured to identify a second geolocation of the second device, and to determine a level of risk for the transaction based at in part on the first geolocation and the second geolocation. The authentication system is further configured to authenticate the user in response to determining that the level of risk is an acceptable level of risk. The authentication system is further configured to generate information to enable the website to perform the transaction with the user on the first device, and sends the information to the website.

Yet another embodiment of the present disclosure provides a computer program product for authenticating a transaction of a user. The computer program product comprises a computer readable storage media having program code stored thereon. The program code includes code for receiving a transaction between a user and a website displayed on a first device. The program code further includes code for identifying a first geolocation of the first device. The program code further includes code for generating a code for display on the first device. The program code further includes code for receiving the code and credential information to identify the user from a second device. The program code further includes code for identifying a second geolocation of the second device, and determining a level of risk for the transaction based at in part on the first geolocation and the second geolocation. The program code further includes code for authenticating the user in response to determining that the level of risk is an acceptable level of risk. The program code further includes code for generating information to enable the user on the first device to perform the transaction with the website, and sending the information to the website.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current methodologies for identifying a user are not as efficient as desired. The illustrative embodiments also recognize and take into account that a user can have multiple user identities and user accounts for various service providers. The illustrative embodiments recognize and take into account that there may be different ways, or different authentication schemes for verifying the user's credentials. For example, the user may login to a server directly, using a username and a password. Alternatively, the user may login to the server using a federated authentication scheme. The illustrative embodiments recognize and take into account that the user may not be aware that that there are additional or different authentication schemes available.

Additionally, the illustrative embodiments recognize and take into account that the user often uses a mobile device. The mobile device has a lock-screen and an inherent local authentication mechanism to unlock the mobile device. For example, the illustrative embodiments recognize that the mobile device may include biometric sensors.

The illustrative embodiments also recognize and take into account that the user may also use a personal computer (PC) or computer system. The computer system may be preferred to authenticate the user because the computer system includes a display and keyboard.

The illustrative embodiments also recognize and take into account that an employer of the user may have a preferred authentication scheme. The illustrative embodiments also recognize and take into account that the user may have a preference on which authentication scheme to use. The illustrative embodiments also recognize that there may be a risk in using a mobile device, such as when the mobile device is used on an unsecure connection or internationally. In this example, certain authentication schemes may not be available.

The illustrative embodiments provide a method and authentication mechanism for authenticating a user of an application on a mobile device. In one illustrative example, a menu is displayed on a mobile device. The menu displays authentication schemes that are available to select, and allows the user to select a favored authentication scheme. The favored authentication scheme is presented ahead of the remainder of authentication schemes. In various embodiments, the favored authentication scheme is based on a policy associated with the user profile.

Figure 1:
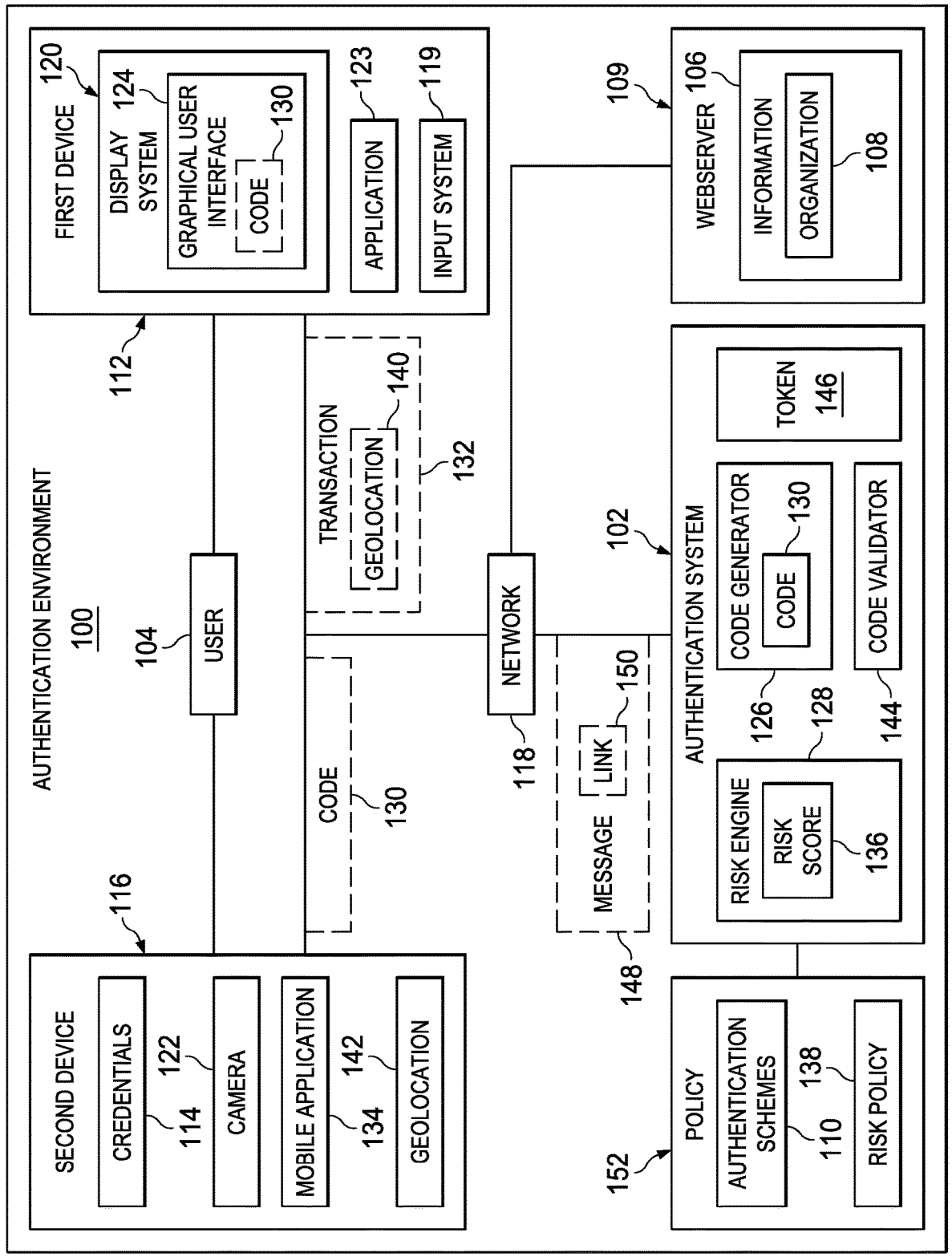
FIG. 1 is an illustration of a block diagram of an authentication environment for authenticating a user, depicted in accordance with an illustrative embodiment.

With reference now to the figures and, in particular, with reference to FIG. 1, an illustration of a block diagram of an authentication environment for authenticating a user is depicted in accordance with an illustrative embodiment. In this illustrative example, authentication environment 100 includes authentication system 102. Authentication system 102 authenticates or verifies the identity of user 104 to permit access to information 106. Information 106 may be information about organization 108.

Organization 108 may be, for example, a corporation, a partnership, a charitable organization, a city, a government agency, or some other suitable type of organization. Information 106 about organization 108 may include, for example, at least one of information about people, products, research, product analysis, business plans, financials, or other information relating to organization 108. Information 106, as used herein, may comprise any information that is related to user 104 in the context of organization 108. Information 106 may include sensitive information such that user 104 may discourage dissemination or disclosure of information 106 to a third party. For example, information 106 may be personal financial information for user 104. For example, information 106 may include at least one of payroll information, tax information, salary information, a social security number, or other types of personal information. Information 106 may be located on webserver 109.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Authentication system 102 comprises physical hardware and may include at least one of server computers, web servers, proxy servers, file transfer protocol servers, workstations, personal computers, laptop computers, tablets, mobile phones, or any other type of data processing system that can verify the identity of user 104. Authentication system 102 may also be referred to herein as an "identity provider," or "service provider."

Authentication system 102 may be implemented in software, hardware, firmware, or a combination thereof. When software is used, the operations performed by authentication system 102 may be implemented in program code configured to run on hardware, such as a processor unit. When firmware is used, the operations performed by authentication system 102 may be implemented in program code and data and stored in persistent memory to run on a processor unit. When hardware is employed, the hardware may include circuits that operate to perform the operations in authentication system 102.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Authentication system 102 may use a number of different authentication schemes 110 to verify the identity of user 104. "A number of," as used herein with reference to an item, means one or more items. For example, authentication system 102 may use a direct authentication scheme that uses password or a federated authentication scheme. In this illustrative example, authentication system 102 may authenticate user 104 on first device 112 using credentials 114 provided by second device 116.

User 104 uses at least one of first device 112 and second device 116 to communicate with authentication system 102 in order to authenticate or verify the identity of user 104. First device 112, second device 116, and authentication system 102 are connected to one another via network 118.

Network 118 is a communication medium and may include one or more wireless or wired data networks. Network 118 may include one or more of a wireless cellular data network, a local area network, a wide area network, the Internet, an intranet, or other suitable types of networks. For example, second device 116 may use a wireless cellular data network, such a code division multiple access (CDMA) or a global system for mobiles (GSM) to access the Internet. Authentication system 102 may access the Internet via a wired link. In this manner, second device 116 is in communication with authentication system 102 via network 118.

First device 112 is a computer system comprising physical hardware such as a desktop computer. For example, the first device 112 includes at least one of a laptop computer, a tablet, a desktop computer, or any other type of computer system that can access information 106 over a network, such as network 118. The access may include at least one of reading, writing, modifying, or operating on information 106.

First device 112 includes input system 119. Input system 119 is a physical hardware system and includes one or more of a mouse, a keyboard, a trackball, a touchscreen, a stylus, or some other suitable type of input device.

As depicted, first device 112 includes display system 120. In this illustrative example, display system 120 can be a group of display devices. A display device in display system 120 may be selected from one of a liquid crystal display (LCD), a light emitting diode (LED) display, an organic light emitting diode (OLED) display, and other suitable types of display devices.

Application 123 is configured to run on first device 112. Application 123 may include at least one of a browser, a mobile application, or some other suitable type of application that is configured to receive and display information 106 and interact with user 104.

Second device 116 comprises physical hardware that is portable, such as a hand-held device. For example, second device 116 includes at least one of a laptop computer, a tablet, a mobile phone, such as a cellular or smart phone, or any other suitable type of portable data processing system that can access information 106 over a network, such as network 118. Second device 116 may have a camera 122.

In one illustrative embodiment, user 104 may prefer to use first device 112 that has application 123, graphical user interface 124, and display system 120 to access information 106. For example, user 104 may find that entering text is easier when using graphical user interface 124, input system 119, and display system 120 of first device 112 as compared to a second device 116.

In this illustrative example, authentication system 102 includes a number of different components to broker access to information 106. As depicted, authentication system 102 includes code generator 126, risk engine 128, and code validator 144.

In this illustrative example, code generator 126 generates code 130 in response to transaction 132 from first device 112. Transaction 132 may be an attempt to access information 106 using first device 112. Code 130 may be any type of two-dimensional bar code that is machine-readable, such as for example, a quick response (QR) code.

In an illustrative example, code 130 may contain encrypted information that allows authentication system 102 to associate credentials 114 provided by second device 116 with transaction 132. Code 130 may be a one-time-code that uses a private key to increase the integrity of and frustrate tampering with code 130. In this manner, code 130 may not be commonly readable, and may only be decrypted by authentication system 102.

Authentication system 102 sends code 130 to first device 112 for display on display system 120 in graphical user interface 124. User 104 uses camera 122 of second device 116 to scan code 130. User 104 then submits code 130 to authentication system 102 in an authenticated context of second device 116.

Mobile application 134 is configured to run on second device 116. Mobile application 134 may include at least one of a browser, a mobile application, or some other suitable type of application that is configured to receive and display information 106 and interact with user 104. User 104 may use mobile application 134 to scan code 130 displayed on first device 112, and transmit information therein to authentication system 102.

As depicted, authentication system 102 includes risk engine 128. In one illustrative example, risk engine 128 is an adaptive authentication and fraud detection platform for authenticating the identity of user 104 in response to transaction 132. Risk engine 128 uses risk-based, multifactor authentication. Using a risk and rules based approach, risk engine 128 may prohibit or require additional identity assurances if transaction 132 is determined to have a high risk score 136, violates risk policy 138, and combinations thereof.

In one illustrative example, risk engine 128 uses a self-learning statistical evaluation to generate risk score 136 for transaction 132. Risk score 136 can be a numeric score within a predefined range, where higher scores indicate a greater level of risk. In an illustrative embodiment, risk engine 128 determines risk score 136 according to at least one of device profiling, behavioral profiling, and data within a repository of known fraud patterns. Risk engine 128 may utilize one or more circumstances such as time of day, geolocation 140 of first device 112, geolocation 142 of second device 116, the quality of network 118, or other factors to determine risk score 136.

In one illustrative example, geolocation 140 is the real-world geographic location of first device 112. Geolocation 140 may be ascertained using network 118 or information in transaction 132. For example, authentication system 102 may identify an internet protocol address of first device 112 from transaction 132. Authentication system 102 may then identify the internet protocol address within a geolocation database to determine geolocation 140. As listed in the geolocation database, geolocation 140 can include at least one of a country, a region, a city, a zip code, a latitude, a longitude, and a time zone in which first device 112 is located.

In one illustrative example, geolocation 142 is the real-world geographic location of second device 116. Geolocation 142 may be ascertained using positioning information, such as global positioning system (GPS) coordinate information, received from a GPS receiver in second device 116. Authentication system 102 may receive geolocation 142 from the GPS receiver in second device 116 in conjunction with one or more of code 130 and credentials 114.

In another illustrative example, authentication system 102 uses a relative geolocation of first device 112 and second device 116 instead of absolute geolocation 140 and geolocation 142. In this illustrative example, authentication system 102 facilitates a short-range wireless connectivity between first device 112 and second device 116. For example, authentication system 102 may facilitates wireless connectivity, such as a Bluetooth connectivity or other suitable short-range wireless connectivity, between first device 112 and second device 116. First device 112, second device 116, or both may send authentication system 102 confirmation of the direct wireless connectivity. Based on the direct connection, authentication system 102 can determine that second device 116 through which the user is authenticating is in physical proximity of first device 112.

Risk engine 128 determines risk score 136 based on risk policy 138. Risk policy 138 is at least one of rules, laws, and practices that outlines access and authentication restrictions for transaction 132. Risk engine 128 uses the comprehensive rules framework of risk policy 138 to translates risk score 136 into decisions and actions regarding transaction 132. Furthermore, risk policy 138 can be used to set threshold risk scores that will require later review, prompt additional assurance or "step-up" authentication from user 104, and deny transaction 132 where the likelihood of fraud is very high.

For example, one rule in risk policy 138 may determine risk score 136 for transaction 132 based on a proximity of geolocation 140 to geolocation 142. By applying risk policy 138, risk engine 128 may determine that risk score 136 has a high likelihood of fraud when geolocation 140 is not in close proximity to geolocation 142. In this illustrative example, risk or 136 has a "high likelihood" when risk score 136 exceeds a threshold risk score defined in risk policy 138. In this illustrative example, geolocation 140 is in "close proximity" to geolocation 142 when the locations are within the same country, a same region, a same city, a same zip code, a same time zone, or are within a defined latitude and longitude zone. When geolocation 140 is not in close proximity to geolocation 142, risk engine 128 may determine a higher value for risk score 136. When geolocation 140 is in "close proximity" to geolocation 142, risk engine 128 may determine a lower value for risk score 136.

In one illustrative example, Risk engine 128 may utilize one or more additional rules in risk policy 138 to determine risk score 136. In addition to geolocation 140 and geolocation 142, risk engine 128 may weigh other variables to determine risk score 136. For example, other rules in risk policy 138 directed to one or more of an IP address of first device 112, an IP address of second device 116, a time of day, a deviation from learned behavioral patterns of this user, a sensitivity of the transaction or information trying to be accessed, may be applied by risk engine 128. Through a sophisticated algorithm, Risk engine 128 determine a value for risk score 136 based on a weighted combination of all the variables.

In one illustrative example, risk engine 136 may apply another policy in risk policy 138 to determine a reaction of authentication system 102 based on risk score 136. For example, one rule in risk policy 138 may allow transaction 132 when risk score 136 is below a threshold risk score that indicates a low likelihood of fraud. Another rule in risk policy 138 may require a "step up" authentication of the user via another authentication method before allowing transaction 132 to proceed when risk score 136 is above a threshold risk score that indicates a low likelihood of fraud. Another rule in risk policy 138 may altogether block transaction 132 when risk score 136 is above a threshold risk score that indicates a low likelihood of fraud.

As depicted, authentication system 102 includes code validator 144. Code validator 144 processes code 130 received from second device 116. Code validator 144 may verify that code 130 identifies transaction 132 of user 104 requesting access to information 106. In an illustrative example, code validator 144 decrypts encrypted information contained within code 130 that allows authentication system 102 to associate credentials 114 provided by second device 116 with transaction 132.

In another illustrative example, authentication system 102 provides an additional level of affinity between the application, devices and end user by remembering prior sessions that were successfully authenticated. For example, a user name or password used in the prior session can be combined with code 130, providing the additional level of affinity.

After validating code 130 and successfully verifying credentials 114 of user 104, authentication system 102 generates token 146. Token 146 may be any security token or cookie that authorizes user 104 to access information 106. For example, token 146 may be a certificate, a session identifier, a web token, an OAuth token, an OpenID Connect, SAML, or other suitable types of tokens or cookies. Authentication system 102 uses token 146 to enable transaction 132 from first device 112.

Token 146 may include an identifier that uniquely identifies at least one of user 104 or second device 116. Token 146 may also include a time stamp indicating when token 146 expires, when token 146 was generated, or a combination of both. Token 146 may be a time-sensitive token such that token 146 expires after a predetermined amount of time has elapsed. The predetermined amount of time may be based on risk score 136, or a level of sensitivity of information 106. For example, the predetermined amount of time may provide a shorter amount of time for information 106 that has a greater level of sensitivity than for information 106 that is less sensitive.

Authentication system 102 sends message 148 to first device 112. Message 148 comprises at least one of token 146, or information that enables first device 112 to access token 146. For example, message 148 may be a dynamically generated message having a unique identifier for the session, such as a session cookie. Message 148 includes link 150 to token 146 residing on authentication system 102. Link 150 is a dynamically generated uniform resource locator (URL). Link 150 includes information that uniquely identifies the session or token 146. For example, link 150 may include a randomly generated number or string that identifies the session or token 146.

Application 123, running on first device 112, receives token 146 from authentication system 102. Token 146 is then stored on first device 112. In various embodiments, a copy of token 146 may also reside on authentication system 102, such that token 146 is available on authentication system 102 and second device 116.

Token 146 enables transaction 132 from first device 112. Token 146 authenticates user 104 at first device 112 such that user 104 can access information 106 using application 123, graphical user interface 124, input system 119, and display system 120 of first device 112, and credentials 114 from second device 116.

In one illustrative example, one or more technical solutions are present that overcome a technical problem with reliably authenticating a user attempting to access information from an untrusted system. As a result, one or more technical solutions may provide a technical effect of reliably authenticating user 104 in an authenticated context of second device 116 when accessing information 106 using first device 112.

As a result, authentication system 102 operates as a special purpose computer system in which components thereof enable user 104 to perform transaction 132 using credentials 114 from second device 116 in a manner that adaptively authenticates the identity of user 104 to more reliably detect and prevent fraudulent access to information 106. For example, authentication system 102 enables transaction 132 only if a determined risk score 136 for transaction 132 is an acceptable level of risk, as defined by policy 152. For example, authentication system 102 enables transaction 132 only when geolocation 140 of first device 112 is in close proximity to geolocation 142 of second device 116 as defined by one or more rules in policy 152.

Thus, authentication system 102 transforms first device 112 into a special purpose computer system as compared to currently available general computer systems that do not have authentication system 102. Currently used general computer systems do not adaptively authenticate the identity of user 104 to more reliably detect and prevent fraudulent access to information 106. Further, currently used general computer systems do not enable transaction 132 only if a determined risk score 136 for transaction 132 is an acceptable level of risk, as defined by policy 152. For example, authentication system 102 enables transaction 132 only when geolocation 140 of first device 112 is in close proximity to geolocation 142 of second device 116 as defined by one or more rules in policy 152.

Figure 2:
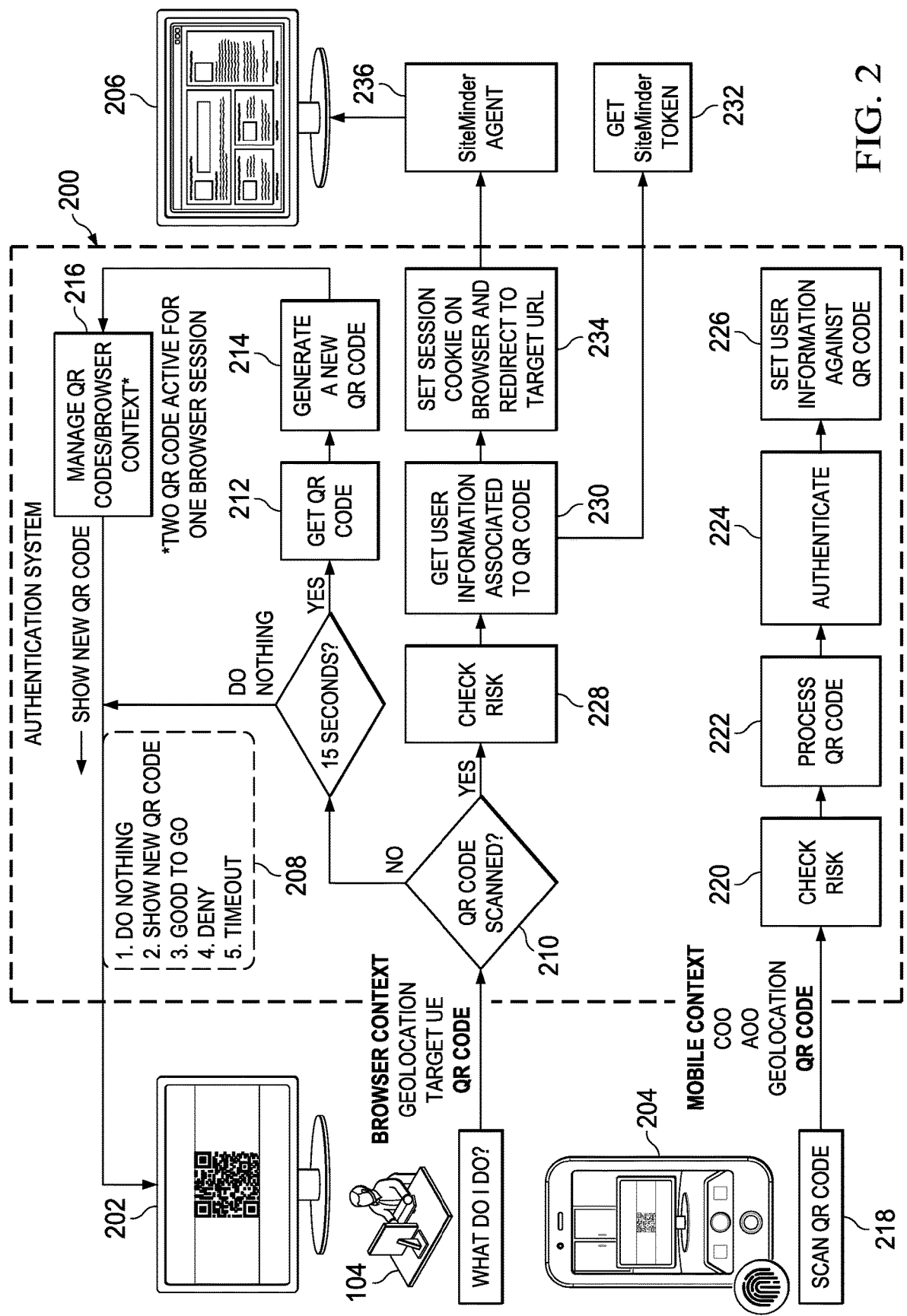
FIG. 2 is an illustration of a data flow diagram for an authentication system in communication with a desktop device and a mobile device, depicted in accordance with an illustrative embodiment.

With reference next to FIG. 2, an illustration of a data flow diagram of an authentication system in communication with a desktop device and a mobile device is depicted in accordance with an illustrative embodiment. In this depicted example, authentication system 200 is an example of authentication system 102, desktop device 202 is an example of first device 112, and mobile device 204 is an example of second device 116, depicted in block form in FIG. 1. In the illustrative example, authentication system 200 authenticates a transaction from desktop device 202 using credentials from mobile device 204.

User 104 attempts to access information 206 by submitting a transaction 208 from desktop device 202. Information 206 is an example of information 106 and transaction 208 is an example of transaction 132, both depicted in block form in FIG. 1. Transaction 208 can include information such as a uniform resource locator (URL) address for information 206, and a geolocation of desktop device 202, such as geolocation 140 shown in block form in FIG. 1.

In response to receiving transaction 208, authentication system 200 checks at block 210 for a code corresponding to transaction 208. The code can be code 130, shown in block form in FIG. 1.

If the code has not been received, authentication system 200 gets code at block 212. Authentication system 200 generates new code at block 214. Note to Inventors—what is the difference between these steps?

When the code has been retrieved/generated, authentication system 200 manages codes and browser context at block 216, such as sending the code to desktop device 202. Desktop device 202 can then display the code on an associated display system, such as display system 120, shown in block form in FIG. 1.

At block 218, user 104 scans the code displayed on desktop device 202 using a camera, such as camera 122 shown in block form in FIG. 1, of mobile device 204. User 104 then submits the scanned code to authentication system 200 in an authentication context of mobile device 204 using an application, such as mobile application 134 shown in block form in FIG. 1, running on mobile device 204.

At block 220, authentication system 200 identifies a risk level associated with information received from mobile device 204. The risk level may be based on circumstances such as time of day, geographic location, the quality of network, or other factors. For example, the geographic location of mobile device 204 may be indicative of an elevated level of risk, such as, for example, an international location. As another example, the quality of the wireless communications network, based on signal strength (e.g., latency or a wireless signal strength) or a presence or lack of an encrypted wireless connection, may influence the risk level. Authentication system 200 may determine the risk level by applying one or more rules in a risk policy, such as risk policy 138 shown in block form in FIG. 1.

If the determined risk level is acceptable according to the risk policy, such as risk policy 138 of FIG. 1, authentication system 200 processes the code at block 222. Authentication system 200 decrypts encrypted information contained within the code 130 that allows authentication system 102 to associate credentials provided by mobile device 204 with transaction 208.

At block 224, authentication system 200 authenticates user 104 based on credentials, such as credentials 114 shown in block form in FIG. 1, received from mobile device 204. For example, authentication system 200 may use a direct authentication scheme that uses credentials such as a password, or a federated authentication scheme that uses credentials supplied by a trusted identity provider.

After successfully verifying credentials of user 104, authentication system 200 associates the credentials, uniquely identifying at least one of user 104 or mobile device 204, with the scanned code at block 226.

At block 228, after determining that the code has been scanned by mobile device 204, authentication system 200 identifies a risk level for the transaction. The risk score is an example of risk score 136, shown in block form in FIG. 1. Authentication system 200 determines risk score based at least in part on the geolocations of desktop device 202 and mobile device 204.

For example, authentication system 200 may determine risk score based on a relative proximity of geolocations of desktop device 202 and mobile device 204. When the geolocations of desktop device 202 and mobile device 204 are in "close proximity," authentication system 200 may determine that the requested transaction has a lower likelihood of fraud, and therefore determine a relatively lower value for risk score 136. When the geolocations of desktop device 202 and mobile device 204 are not in close proximity, authentication system 200 may determine that the requested transaction has a higher likelihood of fraud, and therefore determine a relatively lower value for risk score 136. Based on determined risk score, authentication system 200 can take further remedial actions according to a risk policy, such as risk policy 138 of FIG. 1, such as requiring later review of the transaction, prompting additional assurance or "step-up" authentication from a user, or denying transaction 208 where the determined risk score is very high.

In another illustrative example, authentication system 200 uses a relative geolocation of desktop device 202 and mobile device 204. In this illustrative example, authentication system 200 facilitates a short-range wireless connectivity between desktop device 202 and mobile device 204. For example, authentication system 200 may facilitate wireless connectivity, such as a Bluetooth connectivity or other suitable short-range wireless connectivity, between desktop device 202 and mobile device 204. desktop device 202 and mobile device 204, or both may send authentication system 200 confirmation of the direct wireless connectivity. Based on the direct connection, authentication system 200 can determine that mobile device 204 through which the user is authenticating is in physical proximity of desktop device 202.

If the determined risk level is acceptable according to the risk policy, such as risk policy 138 of FIG. 1, authentication system 200 retrieves the credentials associated with transaction authentication at block 230, and generates a token, such as token 146 of FIG. 1, at block 232.

At block 234, authentication system 200 sends the token to desktop device 202. The token comprises information that enables transaction 208 from desktop device 202 to access information 206.

Desktop device 202 receives the token from authentication system 200. Desktop device 202 stores the token on desktop device 202. In various embodiments, a copy of the token may also reside on authentication system 200.

Transaction 208 from desktop device 202 is enabled based on the stored token. For example, as shown at block 236, the token may be authenticated by a web agent associated with information 206. The web agent allows desktop device 202 to access information 206 only when desktop device 202 has a valid. In this manner, authentication system 200 authenticates user 104 at desktop device 202 such that user 104 can access information 206 using a security context provided by mobile device 204.

Figure 3:
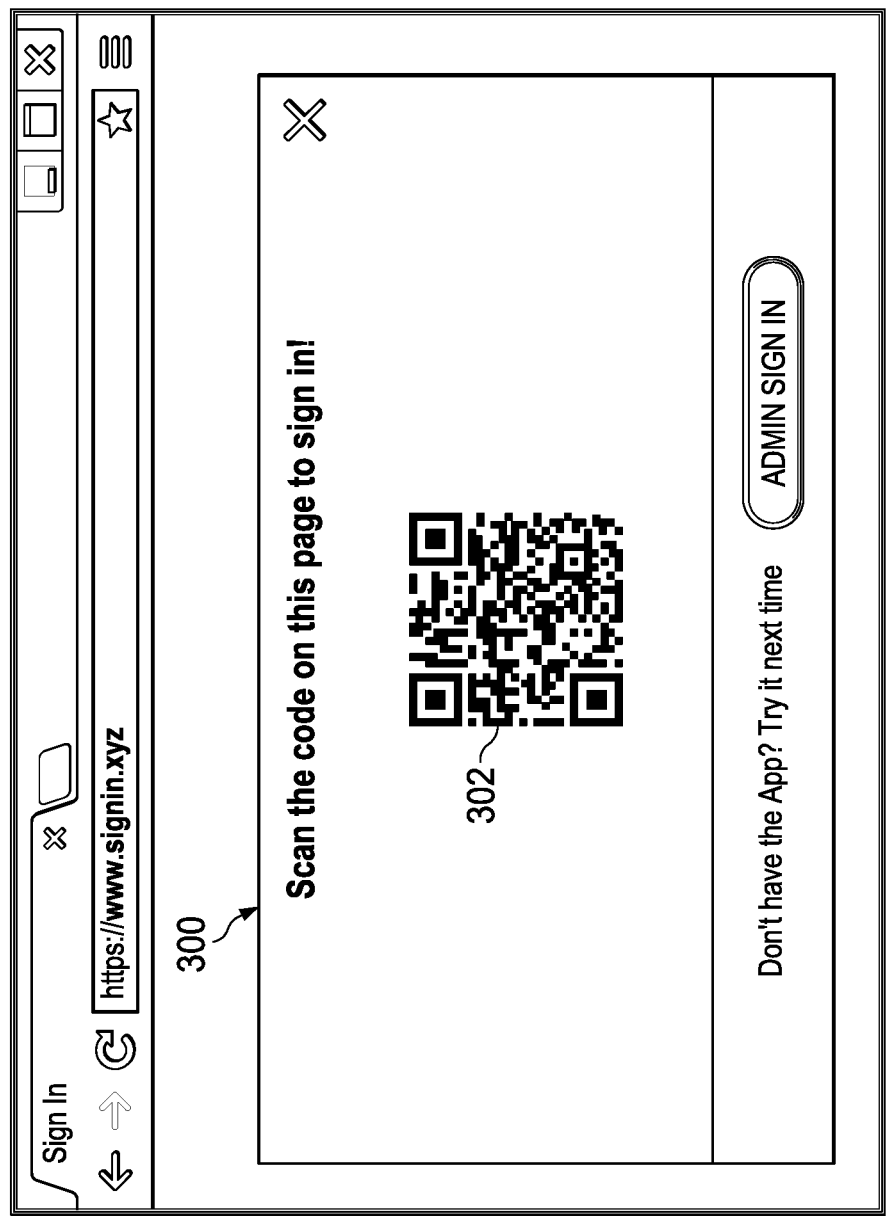
FIG. 3 is an illustration of an example of a graphical user interface displaying a code shown according to an illustrative embodiment.

With reference now to FIG. 3, an example of a graphical user interface displaying a code is shown according to an illustrative embodiment. Graphical user interface 300 is an example of graphical user interface 124 for first device 112, shown in block form in FIG. 1.

Code 302 is displayed within graphical user interface 300. Code 302 is an example of code 130, shown in block form in FIG. 1. In this illustrative example, code 302 is a quick response (QR) code. Code 302 may be a one-time-code that uses a private key to increase the integrity of and frustrate tampering with code 302. In this manner, code 130 may not be commonly readable, and may only be in decrypted by authentication system 102. Code 302 may contain encrypted information that enables an authentication system to verify a user at a first device based on credentials provided by a second device.

Figure 4:
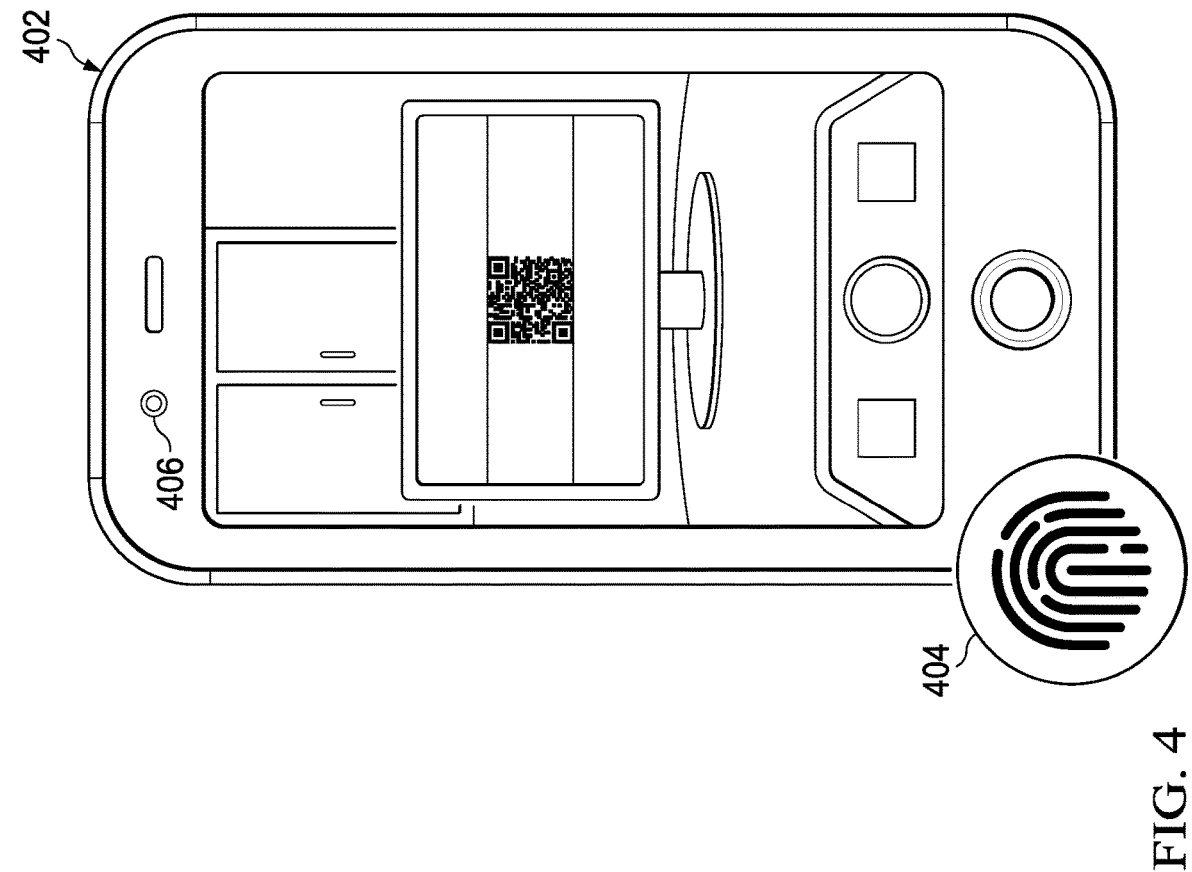
FIG. 4 is an illustration of an example of a mobile application running on a mobile device shown according to an illustrative embodiment.
Figure 4:
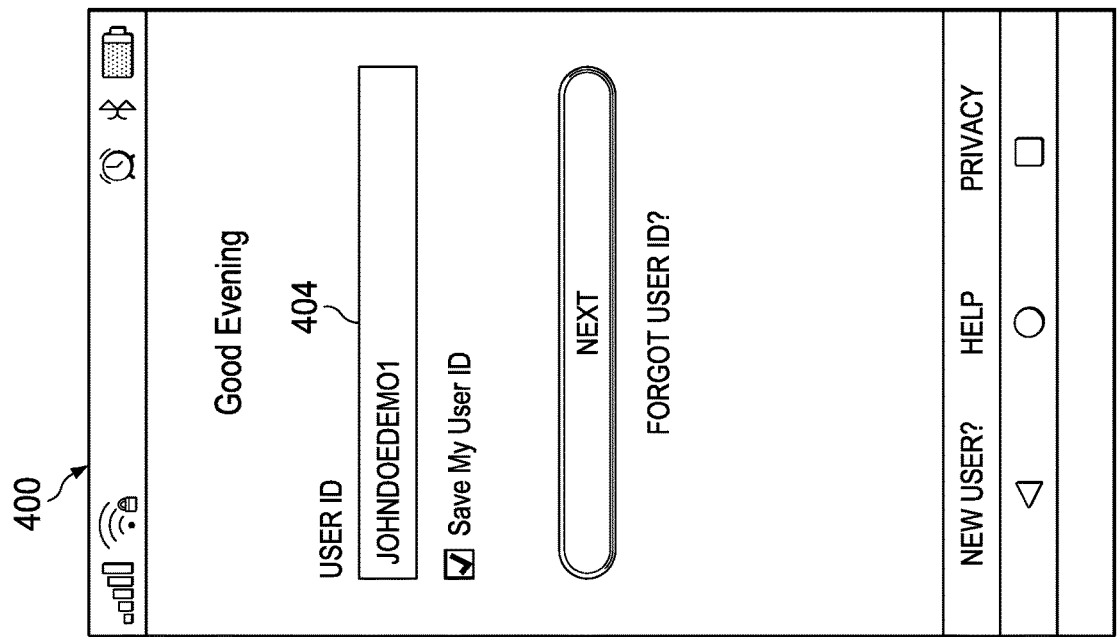

With reference to FIG. 4, an example of a mobile application running on a mobile device is shown according to an illustrative embodiment. Mobile application 400 runs on mobile device 402. Mobile application 400 and mobile device 402 are examples of mobile application 134 and second device 116, both shown in block form in FIG. 1.

Mobile application 400 allows a user to submit credentials 404, to an authentication system for validation. Credentials 404 maybe credentials such as credentials 114 shown in block form in FIG. 1

In this illustrative example, mobile device 402 may comprise a local security mechanism that prohibits inadvertent or unauthorized use of mobile application 400. The local security mechanism may comprises one or more of a fingerprint scan, a password, a personal identification number (PIN), or any other suitable type of mechanism for enabling access to mobile application 400.

Mobile device 402 includes a digital camera 406. Mobile application 400 running on mobile device 402 uses camera 406 to scan a code, such as code 302 of FIG. 3. Mobile application 400 scans the code to identify a link encoded therein. Mobile application 400 then submits credentials to an authentication system for validation of a transaction requested by a separate device, such as first device 112 shown in block form in FIG. 1.

Figure 5:
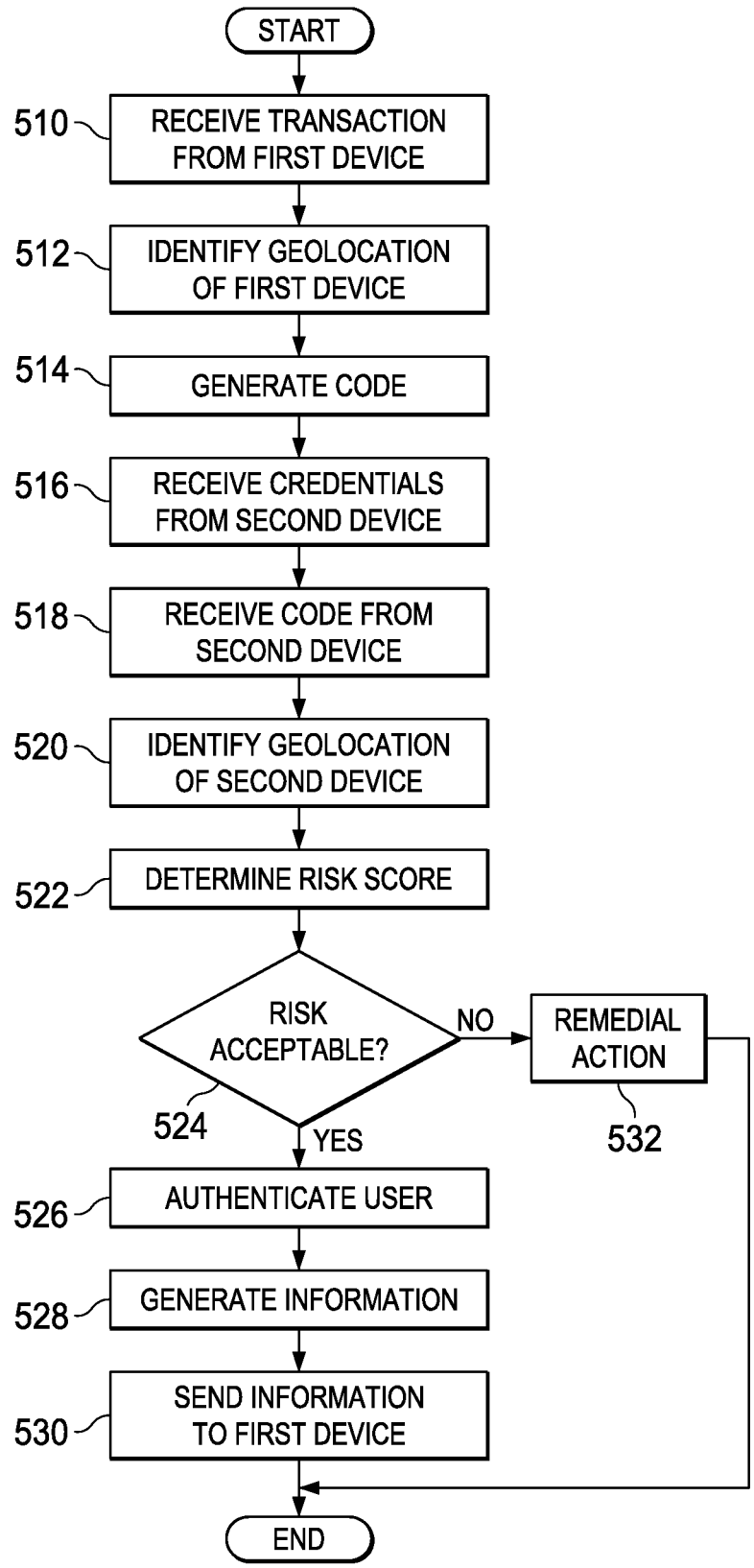
FIG. 5 is an illustration of a flowchart of a method for authenticating a user transaction, depicted in accordance with an illustrative embodiment.

Turning next to FIG. 5, an illustration of a flowchart of a method for authenticating a user transaction is depicted in accordance with an illustrative embodiment. The process in FIG. 5 may be implemented in authentication environment 100 in FIG. 1.

The process begins by receiving by a service provider a transaction between a user and a website displayed on a first device (step 510). The transaction is a login of the user with the website on the first device.

The process then identifying by the service provider a first geolocation of the first device (step 512). The first geolocation can be, for example, geolocation 140 shown in block form in FIG. 1. The first geolocation can be identified from an internet protocol address of the first device. For example, the process can identify identifying the internet protocol address of the first device within a geolocation database. A geolocation associated with the first device can then be identified in the geolocation database. The first geolocation can include, for example, at least one of a country, a region, a city, zip code, a latitude, longitude, and a time zone.

The process then generates a code for display on the first device (step 514). The code can be, for example, code 130 shown in block form in FIG. 1. In one illustrative example, the code is a single use quick response (QR) code that is dynamically generated and sent to the first device for display.

The process receives credentials from the second device (step 516). The credentials can be, for example, credentials 114 of FIG. 1, sent by a mobile device, such as second device 116 of FIG. 1. The credentials received provide an authentication context for authenticating the user of the second device.

The process receives the code from the second device (step 518). The second device can be, for example, second device 116 shown in block form in FIG. 1. In one illustrative example, the second device can be a mobile device having a camera configured to scan the code displayed on the first device. By using the second device to submit the scanned code, the user submits the scanned code to the authentication system in the authentication context of the second device.

The process identifies a second geolocation of the second device (step 520). The second geolocation can be, for example, geolocation 142 shown in block form in FIG. 1. In illustrative examples, the second geolocation can be identified from global positioning location information of the second device, and triangulation signal location information of the second device.

The process then determines a risk score for the transaction (step 522). The risk or can be, for example, risk score 136 shown in block form in FIG. 1. The risk or can be determined by applying a risk policy, such as risk policy 138 shown in block form in FIG. 1. In an illustrative example, the risk score is based at least in part on the first geolocation and the second geolocation, and more specifically, a location proximity between the first device and the second device.

The process then determines whether the risk of the transaction, as indicated by the risk score, is acceptable level of risk (step 524). In one illustrative example, and acceptable level of risk is based in part on a determination the determined risk score does not exceed a threshold risk score. The threshold risk score may be defined in a risk policy, such as risk policy 138, as a threshold risk score that indicates a high likelihood of fraud. The risk score may be an acceptable level of risk based at least in part on the location proximity between the first device and the second device being less than a proximity threshold, as defined in a risk policy, such as risk policy 138 of FIG. 1.

In response to determining that the level of risk is an acceptable level of risk ("yes" at step 524), the process authenticates the user (step 526). The user may be authenticated based on validation of the credentials submitted from the second device, such as credentials 114 shown in block form in FIG. 1.

After authenticating use the user, the process generates information to enable the transaction on the first device (step 528). The information may be a token, such as token 146 of FIG. 1, that authorizes the transaction at the first device. For example, the token may be a certificate, a session identifier, a web token, an OAuth token, an open ID, or other suitable types of tokens. The token may be dynamically generated, having a unique identifier for the session, such as a session cookie, that enables the user to perform the transaction on the first device. The process then sends the information to the first device (step 530), with the process terminating thereafter.

Returning now to step 524, in response to determining that the level of risk is not an acceptable level of risk ("no" at step 524), the process may optionally perform one or more remedial actions (step 532). For example, the process may require later review of the transaction, prompt additional assurance or "step-up" authentication from user, or deny the transaction based on one or more rules of a risk policy, such as risk policy 138 of FIG. 1, to the determined risk score.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
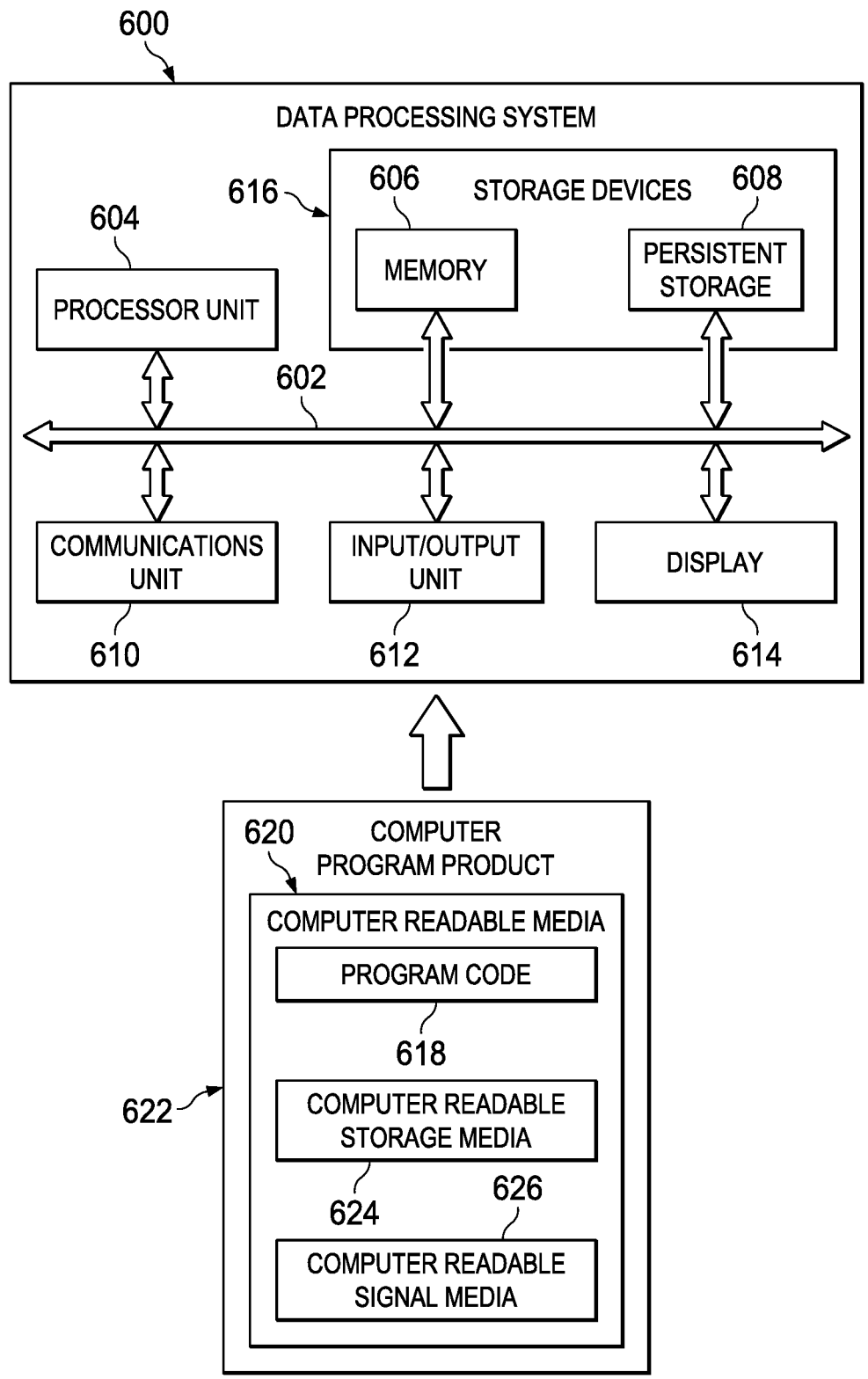
FIG. 6 is an illustration of a block diagram of a data processing system, depicted in accordance with an illustrative embodiment.

Turning now to FIG. 6, an illustration of a block diagram of a data processing system is depicted in accordance with an illustrative embodiment. Data processing system 600 may be used to implement authentication system 102, first device 112, second device 116, or webserver 109 in FIG. 1. In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer readable storage devices in these illustrative examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid state hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer readable program code that may be read and executed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for execution by processor unit 604. Program code 618 and computer readable media 620 form computer program product 622 in these illustrative examples. In one example, computer readable media 620 may be computer readable storage media 624 or computer readable signal media 626.

In these illustrative examples, computer readable storage media 624 is a physical or tangible storage device used to store program code 618 rather than a medium that propagates or transmits program code 618.

Alternatively, program code 618 may be transferred to data processing system 600 using computer readable signal media 626. Computer readable signal media 626 may be, for example, a propagated data signal containing program code 618. For example, computer readable signal media 626 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for authenticating a transaction of a user, the method comprising:
   receiving by a service provider a transaction between a user and a website displayed on a first device;
   identifying by the service provider a first geolocation of the first device;
   generating by the service provider a code for display on the first device;
   receiving by the service provider from a second device credential information to identify the user;
   receiving by the service provider the code from the second device;
   identifying by the service provider a second geolocation of the second device;
   determining, by the service provider, a level of risk for the transaction based at in part on the first geolocation, the second geolocation, and a self-learning statistical evaluation of device profiling, behavioral profiling, and known fraud patterns to generates a numeric risk score for the transaction;
   in response to determining that the level of risk is an acceptable level of risk, authenticating the user;
   generating, by the service provider, information to enable the user on the first device to perform the transaction with the website; and
   sending the information from the service provider to the website.

2. The method of claim 1, wherein the transaction is a login of the user with the website on the first device.

3. The method of claim 1, wherein the first geolocation is identified from an internet protocol address of the first device.

4. The method of claim 3, wherein identifying the first geolocation further comprises:
   identifying the internet protocol address of the first device within a geolocation database; and
   identifying a geolocation associated with the first device in the geolocation database, wherein the geolocation is selected from wherein the geolocation is selected from at least one of a country, a region, a city, a zip code, a latitude, a longitude, and a time zone.

5. The method of claim 1, wherein the second geolocation is identified from at least one of global positioning location information of the second device, and triangulation signal location information of the second device.

6. The method of claim 1, wherein determining the level of risk for the transaction further comprises:
   determining a location proximity between the first device and the second device; and
   determining that the level of risk is the acceptable level of risk when the location proximity between the first device and the second device is less than a proximity threshold.

7. The method of claim 1, wherein the code is a single use quick response (QR) code, wherein generating the code further comprises:
   dynamically generating the single use quick response (QR) code for display on the first device; and
   receiving the QR code from the second device, wherein the second device is a mobile device having a camera configured to scan the QR code displayed on the first device.

8. The method of claim 1, wherein generating information to enable the website to perform the transaction with the user on the first device further comprises:
   generating by the service provider a cookie to enable the user to perform the transaction with the website on the first device; and sending the cookie from the service provider to the first device.

9. A computer system comprising:
a hardware processor; and
an authentication system in communication with the processor and configured:
to receive a transaction between a user and a website displayed on a first device;
to identify a first geolocation of the first device;
to generate a code for display on the first device;
to receive credential information from a second device to identify the user;
to receive the code from the second device;
to identify a second geolocation of the second device;
to determine a level of risk for the transaction based at in part on the first geolocation, the second geolocation, and a self-learning statistical evaluation of device profiling, behavioral profiling, and known fraud patterns to generates a numeric risk score for the transaction;
to authenticate the user in response to determining that the level of risk is an acceptable level of risk;
to generate information to enable the website to perform the transaction with the user on the first device; and
to send the information to the website.

10. The computer system of claim 9, wherein the transaction is a login of the user with the website on the first device.

11. The computer system of claim 9, wherein the first geolocation is identified from an internet protocol address of the first device.

12. The computer system of claim 11, wherein in identifying the first geolocation, the authentication system is further configured:
to identify the internet protocol address of the first device within a geolocation database; and
to identify a geolocation associated with the first device in the geolocation database, wherein the geolocation is selected from wherein the geolocation is selected from at least one of a country, a region, a city, a zip code, a latitude, a longitude, and a time zone.

13. The computer system of claim 9, wherein the second geolocation is identified from at least one of global positioning location information of the second device, and triangulation signal location information of the second device.

14. The computer system of claim 9, wherein in determining the level of risk for the transaction, the authentication system is further configured:
to determine a location proximity between the first device and the second device; and
to determine that the level of risk is the acceptable level of risk when the location proximity between the first device and the second device is less than a proximity threshold.

15. The computer system of claim 9, wherein the code is a single use quick response (QR) code, and wherein in generating the code, the authentication system is further configured:
to dynamically generate the single use quick response (QR) code for display on the first device; and
to receive the QR code from the second device, wherein the second device is a mobile device having a camera configured to scan the QR code displayed on the first device.

16. The computer system of claim 9, wherein in generating information to enable the website to perform the transaction with the user on the first device, the authentication system is further configured:
to generate a cookie to enable the user to perform the transaction with the website on the first device; and
to send the cookie from the service provider to the first device.

17. A computer program product for authenticating a transaction of a user, the computer program product comprising:
a computer readable storage media;
first program code, stored on the computer readable storage media, for receiving a transaction between a user and a website displayed on a first device;
second program code, stored on the computer readable storage media, for identifying a first geolocation of the first device;
third program code, stored on the computer readable storage media, for generating a code for display on the first device;
fourth program code, stored on the computer readable storage media, for receiving credential information to identify the user from a second device;
fifth program code, stored on the computer readable storage media, for receiving the code from the second device;
sixth program code, stored on the computer readable storage media, for identifying a second geolocation of the second device;
seventh program code, stored on the computer readable storage media, for determining a level of risk for the transaction based at in part on the first geolocation, the second geolocation, and a self-learning statistical evaluation of device profiling, behavioral profiling, and known fraud patterns to generates a numeric risk score for the transaction;
eighth program code, stored on the computer readable storage media, for authenticating the user in response to determining that the level of risk is an acceptable level of risk;
ninth program code, stored on the computer readable storage media, for generating information to enable the user on the first device to perform the transaction with the website; and
tenth program code, stored on the computer readable storage media, for sending the information from the service provider to the website.

18. The computer program product of claim 17, wherein the transaction is a login of the user with the website on the first device.

19. The computer program product of claim 17, wherein the first geolocation is identified from an internet protocol address of the first device.

20. The computer program product of claim 19, wherein second program code further comprises:
program code, stored on the computer readable storage media, for identifying the internet protocol address of the first device within a geolocation database; and
program code, stored on the computer readable storage media, for identifying a geolocation associated with the first device in the geolocation database, wherein the geolocation is selected from wherein the geolocation is selected from at least one of a country, a region, a city, a zip code, a latitude, a longitude, and a time zone.

21. The computer program product of claim 17, wherein the second geolocation is identified from at least one of global positioning location information of the second device, and triangulation signal location information of the second device.

22. The computer program product of claim 17, wherein the seventh program code further comprises:
    program code, stored on the computer readable storage media, for determining a location proximity between the first device and the second device; and
    program code, stored on the computer readable storage media, for determining that the level of risk is the acceptable level of risk when the location proximity between the first device and the second device is less than a proximity threshold.

23. The computer program product of claim 17, wherein the code is a single use quick response (QR) code, and wherein the third program code further comprises:
    program code, stored on the computer readable storage media, for dynamically generating the single use quick response (QR) code for display on the first device; and wherein the fifth program code further comprises:
    program code, stored on the computer readable storage media, for receiving the QR code from the second device, wherein the second device is a mobile device having a camera configured to scan the QR code displayed on the first device.

24. The computer program product of claim 17, wherein the ninth program code further comprises:
    program code, stored on the computer readable storage media, for generating by the service provider a cookie to enable the user to perform the transaction with the website on the first device; and
    program code, stored on the computer readable storage media, for sending the cookie from the service provider to the first device.

\* \* \* \* \*